United States Patent
Iijima et al.

(10) Patent No.: US 7,706,137 B2
(45) Date of Patent: Apr. 27, 2010

(54) ELECTRONIC APPARATUS

(75) Inventors: Takashi Iijima, Kawasaki (JP);
Sonomasa Kobayashi, Kawasaki (JP);
Nobuyuki Yamamoto, Kato (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/215,399

(22) Filed: Jun. 27, 2008

(65) Prior Publication Data
US 2009/0002927 A1 Jan. 1, 2009

(30) Foreign Application Priority Data
Jun. 29, 2007 (JP) .............................. 2007-173354

(51) Int. Cl.
G06F 1/16 (2006.01)
G06F 3/02 (2006.01)
E05D 3/06 (2006.01)
E05D 3/10 (2006.01)
H04M 1/00 (2006.01)

(52) U.S. Cl. ............................. 361/679.07; 361/679.06; 361/679.26; 361/679.27; 16/366; 16/367; 345/169; 455/575.3; 248/917

(58) Field of Classification Search ................................ 361/679.01–679.45, 679.55–679.59; 312/223.1, 312/223.2; 248/917–924; 345/168, 169, 345/156, 157, 905; 455/575.1, 575.3, 575.4, 455/905; 16/366–369

See application file for complete search history.

(56) References Cited

U.S. PATENT DOCUMENTS 7,096,540 B2 * 8/2006 Watanabe et al. ............. 16/367
2004/0012920 A1 1/2004 Tanimoto et al.

FOREIGN PATENT DOCUMENTS

| JP | 08-191420 | 7/1996 |
| JP | 2004-053927 | 2/2004 |
| JP | 2004-118409 | 4/2004 |

* cited by examiner

Primary Examiner—Jayprakash N Gandhi
Assistant Examiner—Nidhi Desai
(74) Attorney, Agent, or Firm—Staas & Halsey LLP

(57) ABSTRACT

An electronic apparatus includes a first housing; a second housing; and a coupling unit that openably/closably and rotatably couples the second housing with the first housing. The coupling unit is a biaxial coupling unit having: a rotation axis that vertically extends when the first housing is placed on a horizontal table, and is rotatably coupled to the first housing; and an opening/closing axis that is fixed to the rotation axis, horizontally extends, openably/closably supports the second housing with respect to the first housing, and rotates as the rotation axis rotates. The coupling unit includes a stopper to rotate the rotation axis-only when the second housing is opened with respect to the first housing within a range of rotation-allowing opening angle that allows for rotation.

11 Claims, 10 Drawing Sheets

ELECTRONIC APPARATUS

BACKGROUND OF THE INVENTION

1. Field of the Invention

The present invention relates to an electronic apparatus in which a second housing is openably/closably and rotatably coupled with respect to a first housing.

2. Description of the Related Art

In portable electronic apparatuses such as laptop personal computers and mobile phones, a configuration in which an upper housing having a display screen is openably/closably coupled with respect to a lower housing having a keyboard and a push button has been widely used. Such an electronic apparatus is folded so that the upper housing is laid over the lower housing when the apparatus is carried around, and at the time of operation, the upper housing is opened so that the keyboard and push button may be used; thus the portability of the apparatus is increased without downsizing the keyboard and push button.

Further, in recent years, electronic apparatuses have also been known in which an upper housing is openably/closably and rotatably coupled with respect to a lower housing (see, for example, Japanese Patent Application Publication No. 8-191420 and Japanese Patent Application Publication No. 2004-118409). For example, when a number of persons see the display screen of one personal computer, by rotating the upper housing to which a display screen is disposed with respect to the lower housing, the display screen can be easily turned to each person. Moreover, in recent years, in addition to a conventional input operation mode using a keyboard or the like, a tablet mode using a touch pen for touching the display screen and moving on the display screen to enter instructions has been incorporated into a personal computer. Furthermore, in such a personal computer, in addition to a touch panel for giving instructions by contact using a touch pen and a finger, an input device that incorporates an electromagnetic induction-type digitizer on the back of the display screen, and detects the position on the display screen indicated with a stylus pen is also used. In the tablet mode, by rotating the upper housing with respect to the lower housing, and laying the upper housing over the lower housing with the display screen turned outward, the personal computer can be easily carried around, and input with the touch pen becomes easy. In this manner, by openably/closably and rotatably coupling the upper housing with respect to the lower housing, the operability of the electronic apparatus can further be improved.

Incidentally, although in an electronic apparatus in which an upper housing is rotatable with respect to a lower housing, it is usually assumed that the upper housing is rotated with the upper housing standing with respect to the lower housing, practically, a user who is not familiar with the operation of the apparatus sometimes rotates the upper housing with the apparatus closed or with the apparatus widely opened, which may cause the upper housing and the lower housing to rub against each other and get damaged, or may cause the breakage of the display screen. Conventionally, although a hook to fix the upper housing to the lower housing is sometimes provided on the top of the display screen in order to prevent the rotation in a closed state, there are problems that the appearance is deteriorated, and a case where the upper housing is rotated with the upper housing widely opened cannot be addressed.

SUMMARY OF THE INVENTION

The present invention has been made in view of the above circumstances and provides an electronic apparatus that can prevent damages from occurring when a housing is being rotated.

An electronic apparatus of the present invention, including:

a first housing;

a second housing; and a coupling unit that openably/closably and rotatably couples the second housing with the first housing, wherein the coupling unit, which is a biaxial coupling unit having a rotation axis that vertically extends when the first housing is placed on a horizontal table, and is rotatably coupled to the first housing, and an opening/closing axis that is fixed to the rotation axis, horizontally extends, openably/closably supports the second housing with respect to the first housing, and rotates as the rotation axis rotates, the coupling unit includes stoppers to rotate the rotation axis only when the second housing is opened with respect to the first housing within a range of rotation-allowing opening angle that allows for rotation.

In the electronic apparatus of the present invention, although the second housing is openably/closably and rotatably coupled to the first housing, the rotation of the second housing is prohibited by the stoppers when the second housing is opened with respect to the first housing beyond the range of rotation-allowing opening angle that allows for rotation. Therefore, a problem that the second housing is rotated with the second housing closed or widely opened with respect to the first housing, and hits an obstacle, which results in the breakage of the second housing, can be prevented.

Further, in the electronic apparatus of the present invention, it is preferred that the stoppers are unrotatably supported by the first housing, and each of the stoppers and the rotation axis have a stopper-side fitting section and a rotation axis-side fitting section, respectively, which are fitted into each other in a closed state in which the second housing is laid over the first housing, and the stopper and a second housing assembly, which includes the second housing and the opening/closing axis, have a stopper-side contact member and a second housing-side contact member, respectively, which are brought into contact with each other to release the fit of the stopper-side fitting section into the rotation axis-side fitting section when the second housing is opened within the range of rotation-allowing opening angle from the closed state.

When the second housing is in the closed state in which the second housing is laid over the first housing, the stopper-side fitting section and the rotation axis-side fitting section are fitted into each other to prohibit the rotation of the second housing, and when the second housing is opened within the range of rotation-allowing opening angle from the closed state, the stopper-side contact member and the second housing-side contact member are brought into contact with each other to release the fit of the stopper-side fitting section into the rotation axis-side fitting section, allowing the open/closed state of the second housing and the prohibition/release of the rotation of the second housing to be easily interlocked. Further, although conventionally, a lock mechanism to stop rotation is usually provided near the display screen so that the housing is not rotated when the personal computer is carried around with the personal computer closed, in the electronic apparatus of the present invention, in the closed state, the rotation of the second housing is prohibited, allowing the lock mechanism near the display screen to be eliminated, which presents an excellent design advantage.

Further, in the electronic apparatus of the present invention, it is preferred that when the second housing is rotated about the rotation axis after the second housing-side contact member is brought into contact with the stopper-side contact member, the contact of the second housing-side contact member with the stopper-side contact member is released, and the release of the fit of the stopper-side fitting section into the rotation axis-side fitting section is kept.

According to the preferred electronic apparatus, in a state in which the second housing is opened/closed beyond the range of rotation-allowing opening angle, the rotation of the second housing can be prohibited, on the other hand, when the second housing is opened/closed beyond the range of rotation-allowing opening angle after the second housing is rotated, the rotation of the second housing can be allowed.

Furthermore, in the electronic apparatus of the present invention, it is preferred that the stopper-side fitting section is formed of a protruding portion that protrudes upward, and the rotation axis-side fitting section is formed of a depressed portion that opens downward, and into which the protruding portion is fitted, the stopper is energized upward by a spring and the protruding portion is fitted into the depressed portion in the closed state, and the second housing-side contact member pushes down the stopper-side contact member from above to remove the protruding portion from the depressed portion when the second housing is opened within the range of rotation-allowing opening angle from the closed state.

In the closed state of the second housing, the protruding portion of the stopper-side fitting section is fitted into the depressed portion of the rotation axis-side fitting section to prohibit the rotation of the second section, and when the second housing is opened within the range of rotation-allowing opening angle from the closed state, the second housing-side contact member provided on the second housing pushes down the stopper-side contact member from above to push down the depressed portion of the stopper-side fitting section, allowing the prohibition/release of the rotation of the second housing to be easily controlled.

Furthermore, in the electronic apparatus of the present invention, it is preferred that a set of the stopper-side fitting section and the rotation axis-side fitting section, and a set of the stopper-side contact member and the second housing-side contact member are provided, respectively, on both sides of the center of the rotation axis.

The set of the stopper-side fitting section and the rotation axis-side fitting section, and the set of the stopper-side contact member and the second housing-side contact member are provided, respectively, on both sides of the center of the rotation axis, thus allowing the prohibition/release of the rotation of the second housing to be reliably controlled, and preventing the interference of the stopper-side contact member with the second housing-side contact member after the start of rotation of the second housing, which results in achievement of smooth rotation.

Further, in the electronic apparatus of the present invention, it is preferred that the stopper-side contact member is made of a stiffer material than that of a portion other than the stopper-side fitting section of the stopper.

The stopper-side contact member is made of the stiffer material, thus allowing abrasion due to contact with the second housing-side contact member to be suppressed.

Furthermore, in the electronic apparatus of the present invention, it is preferred that the stopper has an arm extending on both sides of the center of the rotation axis, the stopper-side fitting section at a position halfway of the arm, and the stopper-side contact member at an end of the arm.

According to the preferred electronic apparatus, the prohibition/release of the rotation of the second housing can be controlled with a simple mechanism.

Moreover, in the electronic apparatus of the present invention, it is preferred that the second housing-side contact member is a metal member, and the stopper-side contact member is a resin member having a higher lubricating property than that of the second housing-side contact member. Selecting the material of each contact member in this manner allows generation of flakes from the stopper-side contact member due to the rotation of the second housing to be prevented, and allows malfunction of the electronic apparatus due to the penetration of the flakes into the second housing to be prevented.

Further, in the electronic apparatus of the present invention, it is preferred that the second housing has a display screen where information is displayed.

Furthermore, in the electronic apparatus of the present invention, it is preferred that the first housing has a keyboard by which instructions corresponding to operation are entered.

Moreover, in the electronic apparatus of the present invention, it is preferred that the electronic apparatus is provided with display control means that displays, in a first usage state in which the second housing is opened with respect to the first housing, information in a first display mode in which information is displayed on the display screen with the direction of the rotation axis as the vertical direction, and also displays, in a second usage state in which the second housing is laid over the first housing with the display screen turned outward, information in a second display mode in which information is displayed with the direction perpendicular to the rotation axis as the vertical direction.

A tablet personal computer is convenient when it can be used in such a manner that, in a normal usage state (first usage state) using a keyboard or the like, the display screen is used in landscape orientation with the direction of the rotation axis as the vertical direction, and when the tablet function is used (second usage state), the display screen is used in portrait orientation with the direction perpendicular to the rotation axis as the vertical direction. According to the electronic apparatus of the present invention, information can be displayed in the orientation that is suited to each application in the first usage state and the second usage state.

According to the present invention, in an electronic apparatus in which two housings are openably/closably and rotatably coupled to each other, damages occurring when the housing is being rotated can be prevented.

DETAILED DESCRIPTION OF THE INVENTION

An embodiment of the present invention will now be described with reference to the drawings.

Figure 1:
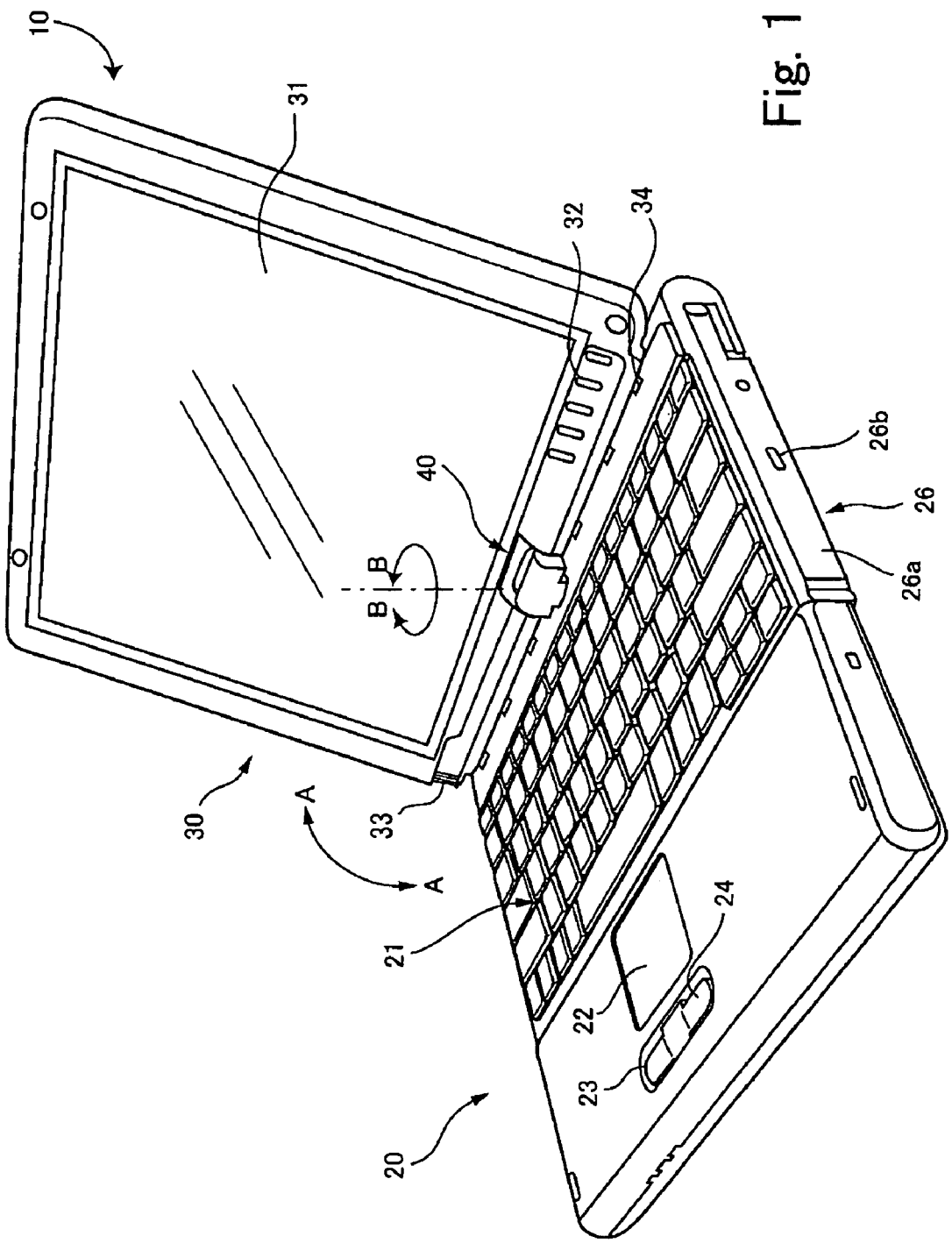
FIG. 1 is an exterior perspective view of a personal computer to which an embodiment of the present invention is applied.

FIG. 1 is an exterior perspective view of a personal computer to which an embodiment of the present invention is applied.

A personal computer 10 shown in FIG. 1 is provided with an input device that incorporates an electromagnetic induction-type digitizer on the back side of a display screen 31, and detects the position on the display screen 31 indicated with a stylus pen so as to allow instruction input. Note that, as the input device, a touch panel which is incorporated into the display screen 31 may be used instead of the digitizer and the stylus pen.

The personal computer 10 is provided with a main unit 20 and a display unit 30, and the main unit 20 and the display unit 30 are coupled by a biaxial coupling unit 40 so that the display unit 30 can be opened/closed in the arrow A-A direction, and can be rotated (about the rotation axis perpendicular to the main unit 20) in the arrow B-B direction, with respect to the main unit 20. Note that in the personal computer of the present embodiment, in a state in which the display unit 30 is opened/closed beyond a predetermined specified opening angle (80 to 100 degrees in the present embodiment) with the coupling unit 40, the rotation of the display unit 30 about the rotation axis is prohibited by a rotation control mechanism. The rotation control mechanism will be described later. The personal computer 10 is shown in FIG. 1 in a state in which the display unit 30 is opened with respect to the main unit 20 (open state), and the open state corresponds to the first usage state according to the present invention. Further, the main unit 20 corresponds to an example of the first housing according to the present invention, the display unit 30 corresponds to an example of the second housing according to the present invention, and the coupling unit 40 corresponds to an example of the coupling unit according to the present invention.

The main unit 20 is provided with a keyboard 21, a track pad 22, a left click button 23 and a right click button 24, as well as a rubber display unit receiver 34 to reduce abrasion due to collision caused when the display unit 30 is opened/closed and rotated. Furthermore, the main unit 20 is provided with, on its one side, an opening/closing cover 26a for an optical disk drive 26 where an optical disk such as CDs and DVDs is loaded, driven and accessed, and an eject button 26b, which is pushed to open the opening/closing cover 26a, is provided on the opening/closing cover 26a. The keyboard 21 corresponds to an example of the keyboard according to the present invention.

The display unit 30 of the personal computer 10 has the display screen 31 spreading over the front surface thereof. Further, the display unit 30 has push buttons 32 on its right edge under the display screen 31, and a fingerprint sensor 33, which recognizes a fingerprint when a person moves his/her finger along the sensor, on its left edge. The display screen 31 corresponds to an example of the display screen according to the present invention. In the open state shown in FIG. 1, information is displayed on the display screen 31 with the direction of the rotation axis of the display unit 30 as the vertical direction.

Figure 2:
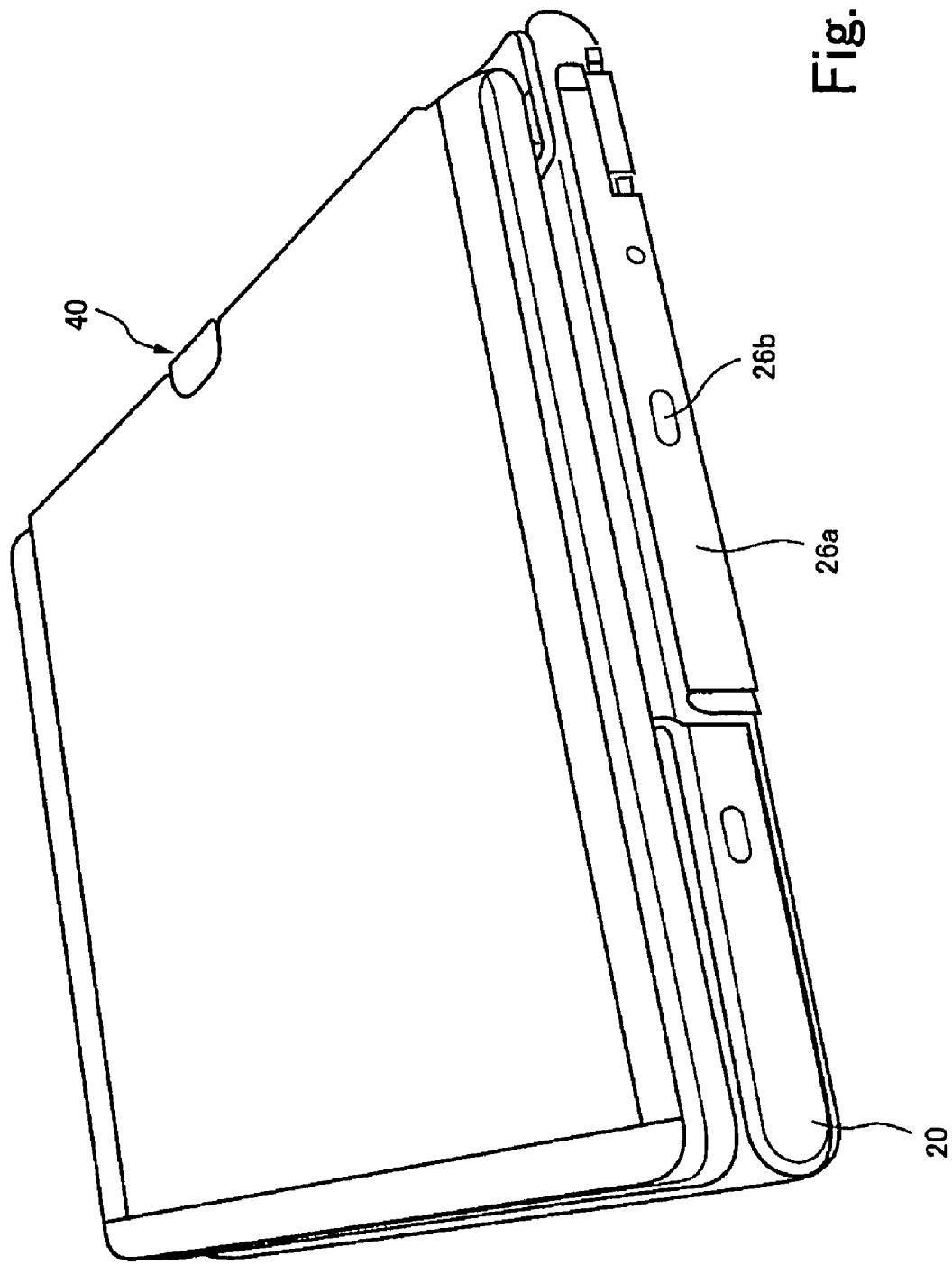
FIG. 2 is an exterior perspective view showing an electronic apparatus in a state in which a display unit is closed over a main unit.

FIG. 2 is an exterior perspective view showing the electronic apparatus in a state in which the display unit 30 is closed over the main unit 20.

In FIG. 2, the display unit 30 is laid over the main unit 20 with the display screen 31 (see FIG. 1) turned toward the main unit 20. Hereinafter, this state is referred to as a first closed state.

In an open state shown in FIG. 1, when the display unit 30 is closed in the arrow A direction, as shown in FIG. 2, the display screen 31 is hidden inward, and the back of the display screen 31 is exposed outward, which is in the first closed state. The personal computer 10 can be carried around in the first closed state, which prevents damages and dirt onto the display screen 31.

Figure 3:
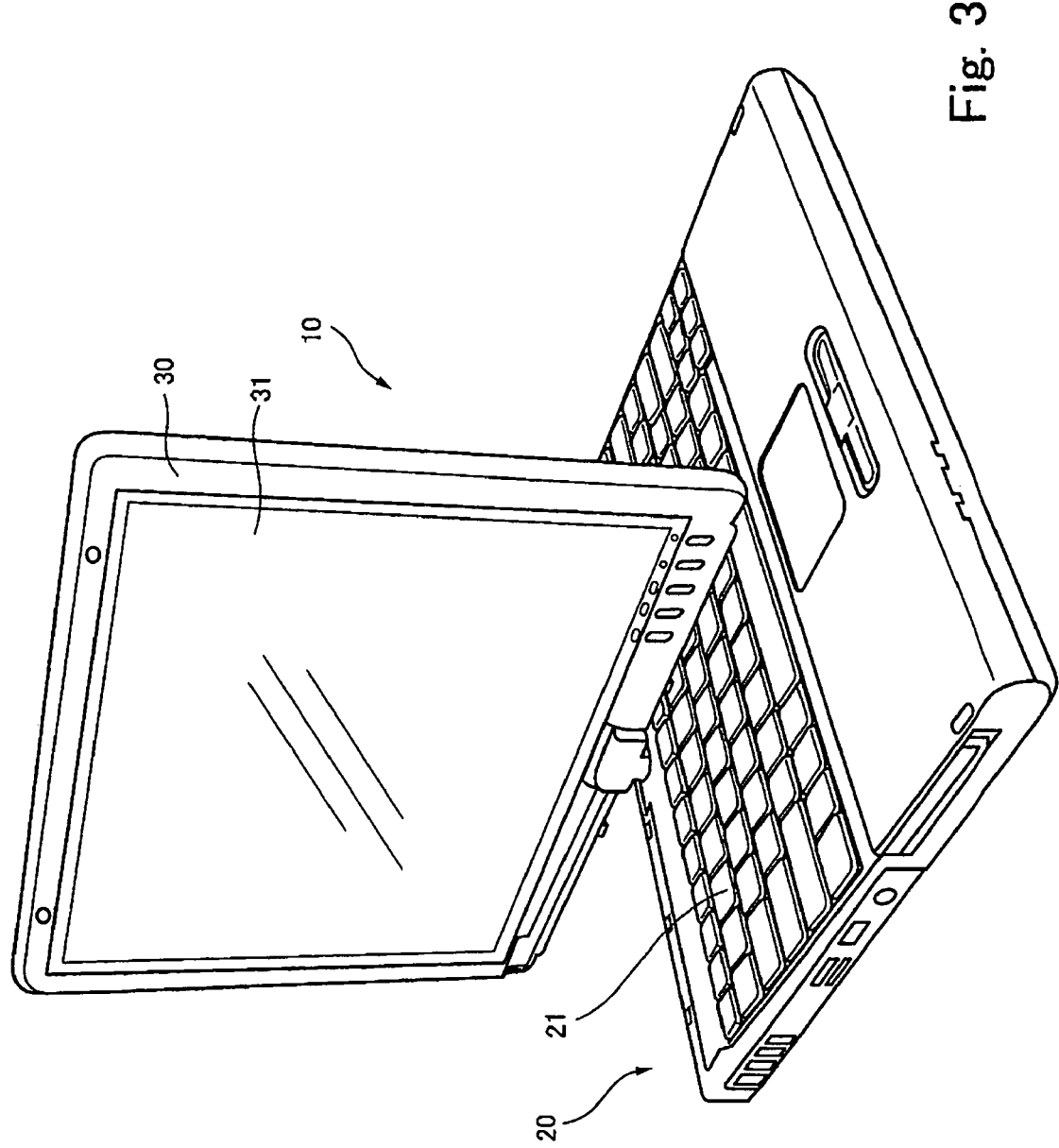
FIG. 3 is an exterior perspective view showing a state in which the display unit is rotated almost 90 degrees with respect to the main unit.

FIG. 3 is an exterior perspective view showing a state in which the display unit is rotated almost 90 degrees with respect to the main unit.

The display unit 30 can be rotated via this state so that the display screen 31 is turned to the side opposite to the keyboard 21.

Figure 4:
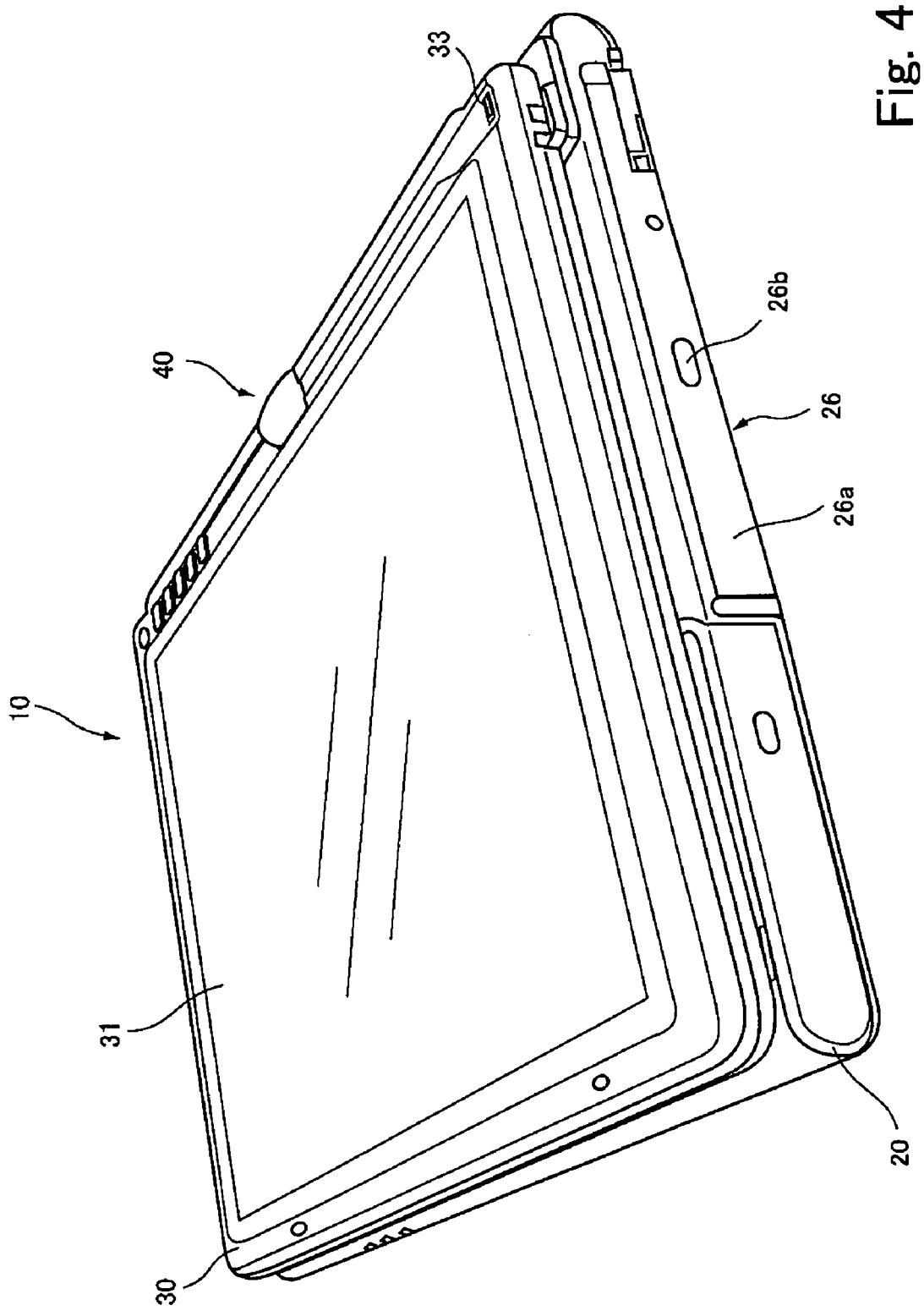
FIG. 4 is an exterior perspective view showing a state in which the display unit is laid over the main unit with the display screen turned upward.

FIG. 4 is an exterior perspective view showing a state in which the display unit is laid over the main unit so that the display screen is turned upward.

The display unit 30 is rotated via an attitude shown in FIG. 3 so that the display screen 31 is turned to the side opposite to the keyboard 21, and then the display unit 30 is laid over the main unit 20 with the back of the display screen 31 of the display unit 30 turned toward the main unit 20, which is in a second closed state shown in FIG. 4. The second closed state corresponds to an example of the second usage state according to the present invention. Hereinafter, an operation mode in which the personal computer 10 is used in the second closed state is referred to as a tablet mode.

As described above, the display screen 31 is a display screen having a pen input function, which is provided with an electromagnetic induction-type digitizer on the back side thereof, and detects the position indicated on the display screen; the usually adopted usage mode is one in which the personal computer 10 in the tablet mode is held with one arm, and the display screen is operated by holding a pen (not shown) with the hand of the other arm. Considering the relationship with the line of sight when the personal computer 10 in the tablet mode is held with an arm, the display image on the display screen 31 is rotated by 90 degrees compared to the open state shown in FIG. 1. That is to say, in the tablet mode, information is displayed on the display screen 31 with the direction perpendicular to the rotation axis of the display unit 30 as the vertical direction.

Then, the internal configuration of the personal computer 10 will be described.

Figure 5:
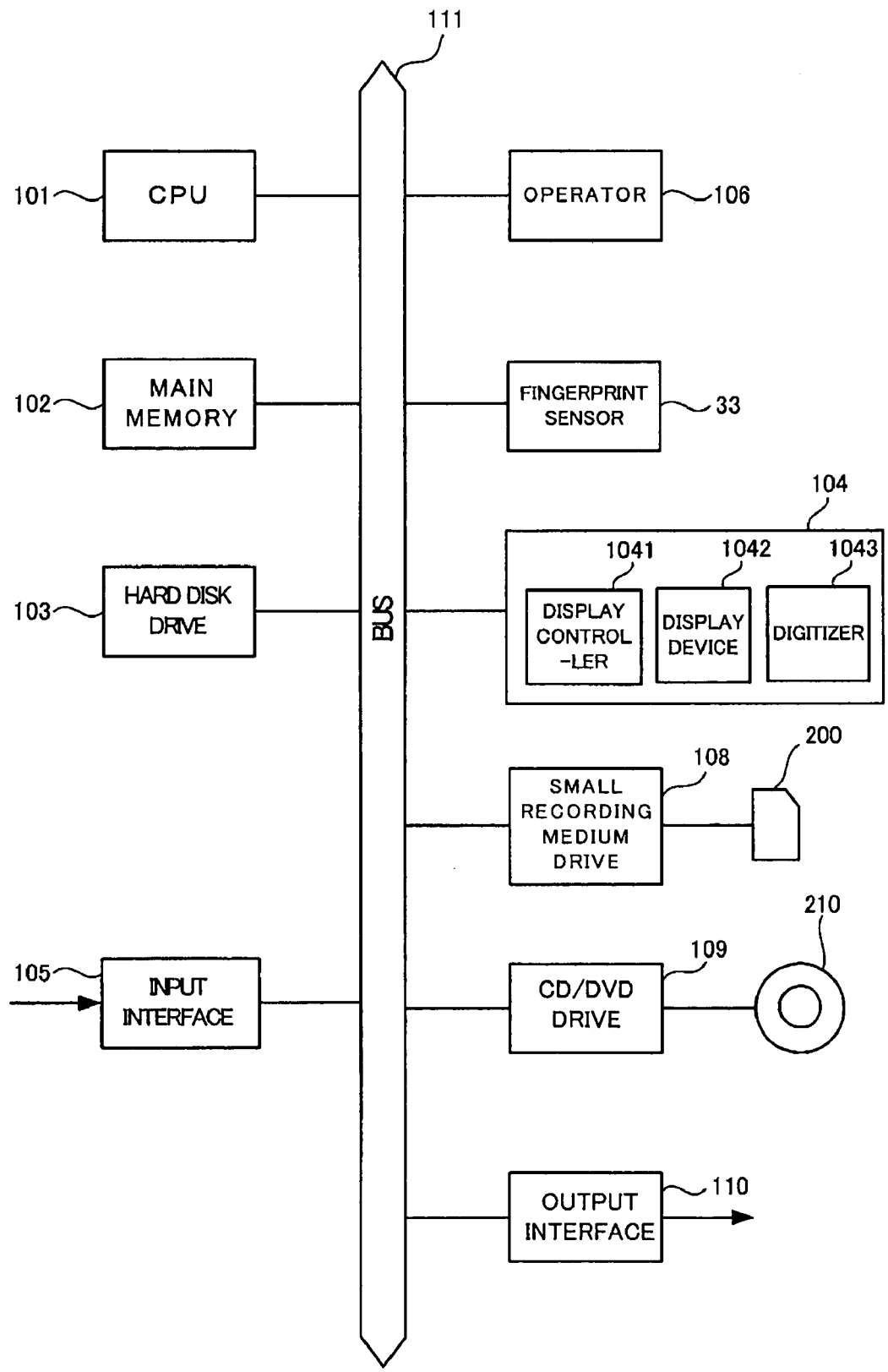
FIG. 5 is a diagram of the internal configuration of the personal computer.

FIG. 5 is a diagram of the internal configuration of the personal computer 10.

As shown in FIG. 5, the personal computer 10 incorporates a CPU 101 that executes various programs, a main memory 102 to which the program stored in a hard disk device 103 is read out to be executed by the CPU 101, the hard disk device 103 in which the various programs and data are stored, a display mechanism 104 that is responsible for processing information display, an operator 106 that includes the keyboard 21 and the track pad 22, a small recording medium drive 108 where a small recording medium 200 is loaded and accessed, a CD/DVD drive 109 where a CD-ROM 210 or a DVD is loaded and accessed, an input interface 105 that inputs data from an external device, an output interface 110 that outputs data to an external device, and the fingerprint sensor 33, which is also shown in FIG. 1, and each component is connected to one another through a bas 111. Note that the display mechanism 104 is composed of a display controller 1041 that controls the orientation of information displayed on the display screen 31 shown in FIG. 1, a display device 1042 that displays information on the display screen 31, and a digitizer 1043 that is mounted on the back of the display screen 31. The display controller 1041 corresponds to an example of the display control section according to the present invention.

Then, the coupling unit 40 will be described in detail.

Figure 6:
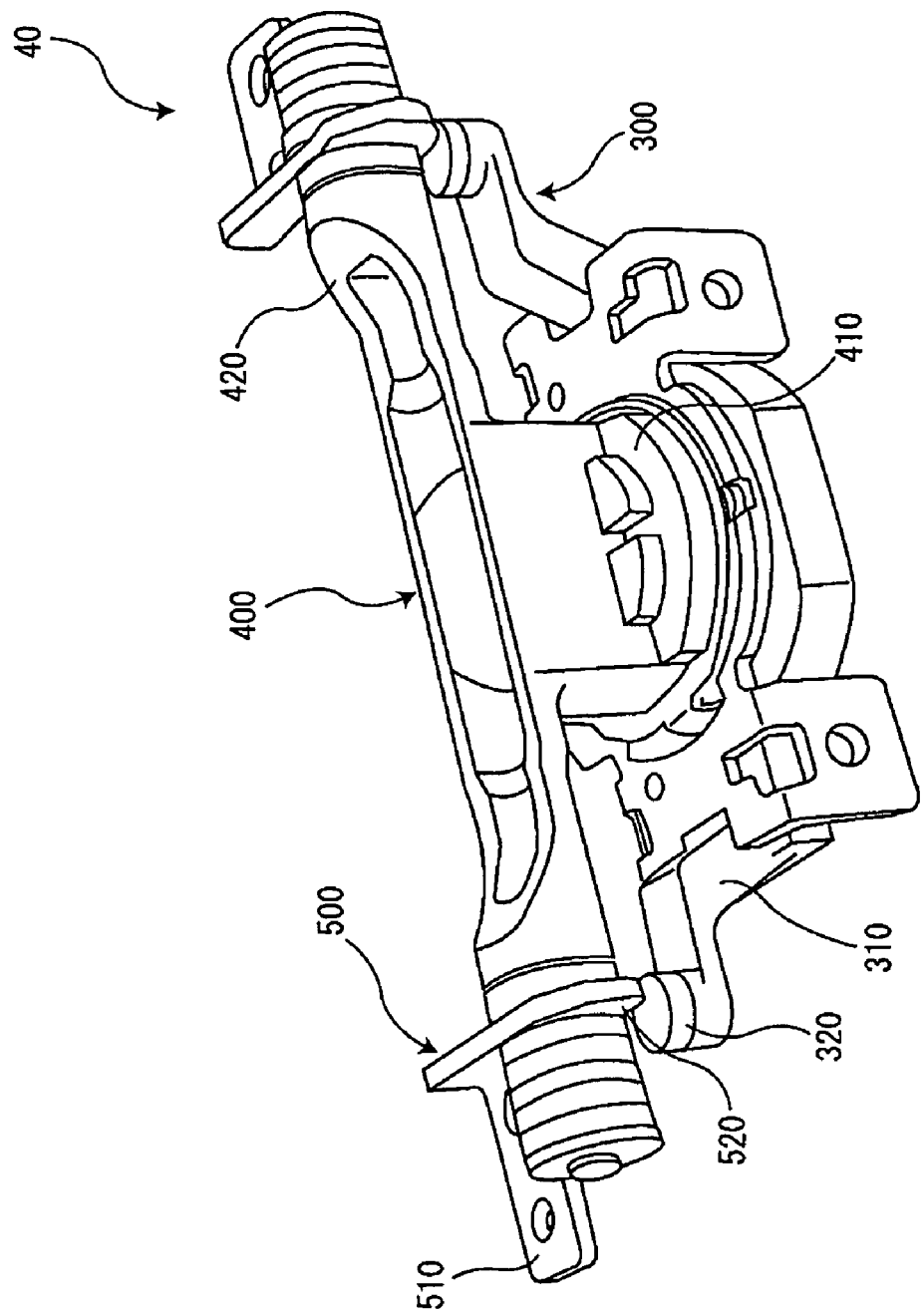
FIG. 6 is a magnified view of a coupling unit.

FIG. 6 is a magnified view of the coupling unit 40.

FIG. 6 shows the coupling unit 40 in a state in which the display unit 30 is fully opened with respect to the main unit 20. The coupling unit 40 includes stoppers 300 that prohibit the rotation of the display unit 30, a rotation section 400 that rotates the display unit 30 in the arrow B direction in FIG. 1, and opening/closing sections 500 that open/close the display unit 30 in the arrow A direction in FIG. 1. The stopper 300 corresponds to an example of the stopper according to the present invention, the rotation section 400 corresponds to an example of the rotation axis according to the present invention, and the opening/closing section 500 corresponds to an example of the, opening/closing axis according to the present invention.

Each stopper 300 is energized vertically upward (upward in FIG. 6) with respect to the main unit 20, and has an arm 310 extending from the center of the rotation axis of the display unit 30 to one side. A protrusion 320 protruding vertically upward (upward in FIG. 6) from the end of each arm 310 with respect to the main unit 20 is also provided. The arm 310 is made of a metal material, and the protrusion 320 is made of a resin material having a higher lubricating property than that of the arm 310. The arm 310 corresponds to the arm according to the present invention, and the protrusion 320 corresponds to an example of the stopper-side contact member according to the present invention.

The rotation section 400 has a rotor 410 which serves as the rotation axis of the display unit 30, and an arm 420 that extends from the rotor 410, and extends from the center of the rotation axis to both sides, and has the opening/closing sections 500, which are attached on each side.

Each opening/closing section 500 opens/closes the display unit 30 by rotating about the arm 420 of the rotation section 400, and has a fixture 510 that is fixed to the display unit 30, and a front section 520 that is formed on a portion of the fixture 510, and comes into contact with the protrusion 320 on the stopper 300. The opening/closing section 500 rotates with the arm 420 extending from the rotor 410 when the rotor 410 of the rotation section 400 is rotated. The fixture 510 and the front section 520 provided thereon are made of a metal member as with the arm 420. The front section 520 corresponds to an example of the second housing-side contact member according to the present invention. The front section 520 has a tapered shape whose peripheral portion coming into contact with the protrusion 320 of the stopper 300 has a predetermined curve to allow the rotation control described later to be achieved.

In FIG. 6, the fixture 510 of the opening/closing section 500 is laid, the front section 520 is turned forward, and the display unit 30 is fully opened with respect to the main unit 20. When the display unit 30 is erected, the opening/closing section 500 rotates about the arm 420 to close the display unit 30. At that time, the front section 520 of the opening/closing section 500 moves downward as the display unit 30 is closed, and gradually pushes down the protrusion 320 of the stopper 300.

Figure 7:
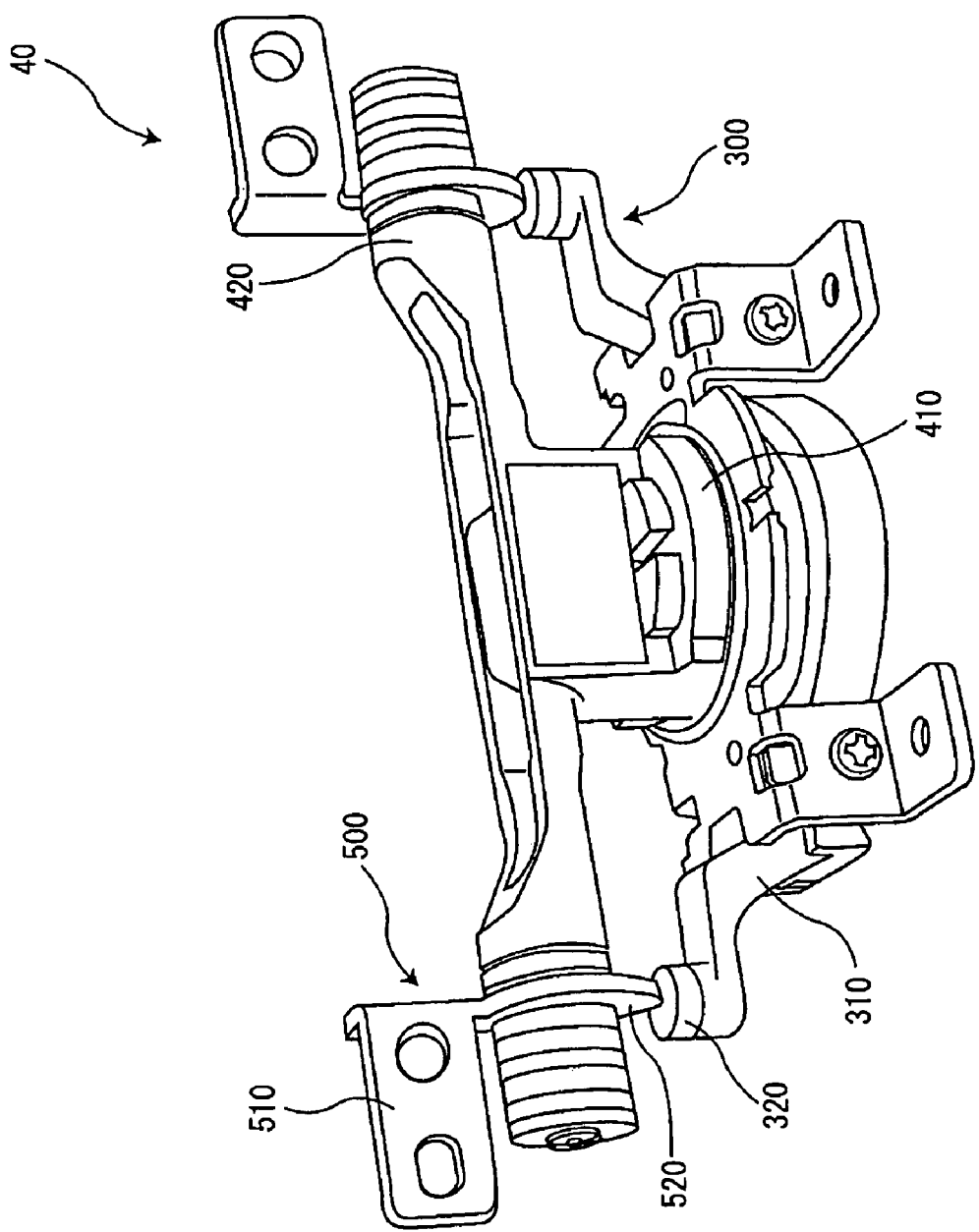
FIG. 7 is a magnified view of the coupling unit in a state in which the display unit is standing with respect to the main unit.

FIG. 7 is a magnified view of the coupling unit 40 in a state in which the display unit 30 is standing with respect to the main unit 20.

When the display unit 30 is standing with respect to the main unit 20, the front section 520 of the opening/closing section 500 is turned vertically downward (downward in FIG. 6) with respect to the main unit 20, and the protrusion 320 of the stopper 300 is pushed down most.

Figure 8:
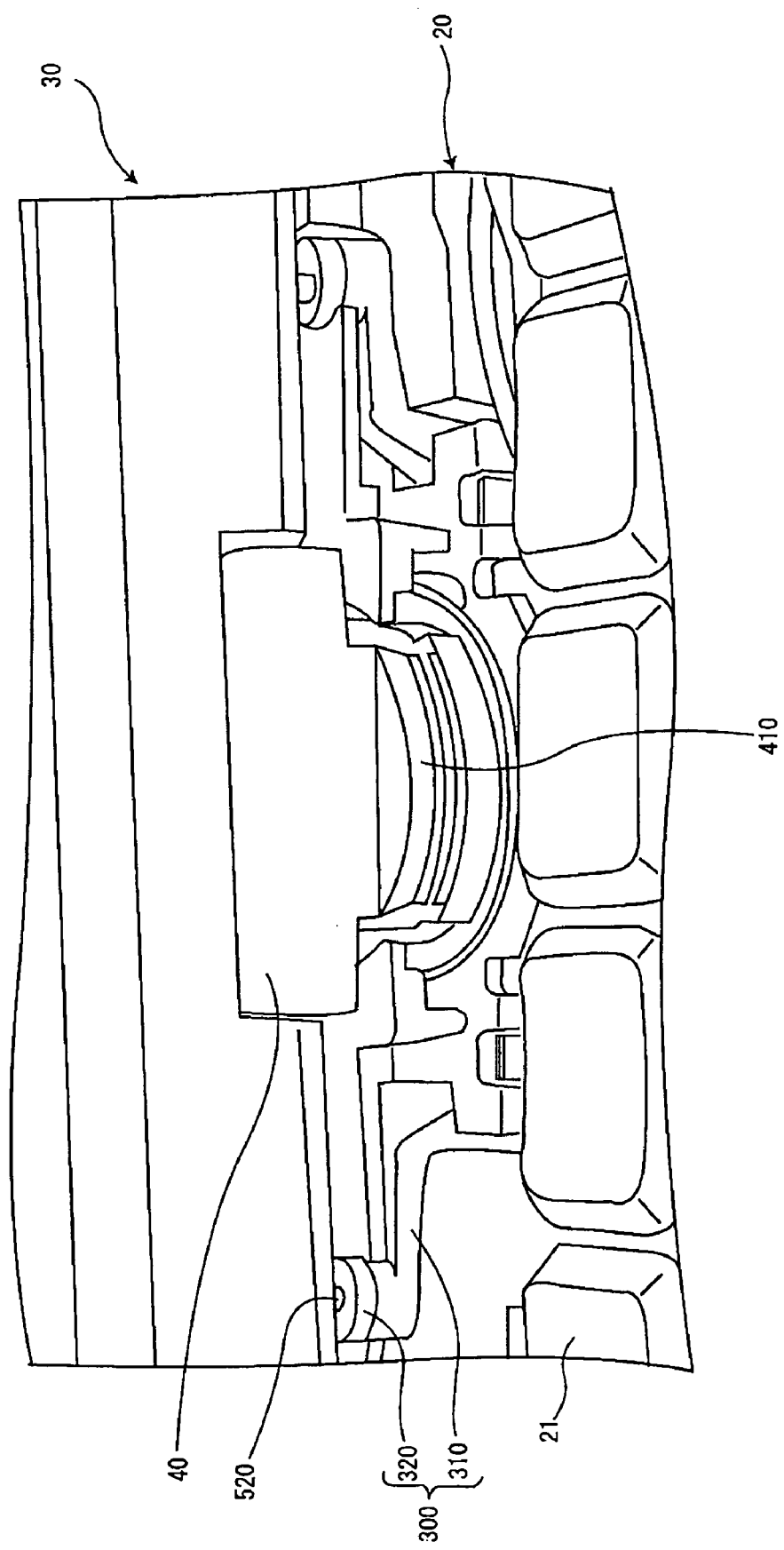
FIG. 8 is a magnified view around the coupling unit while the personal computer is being assembled.

FIG. 8 is a magnified view around the coupling unit while the personal computer 10 is being assembled.

As shown in FIG. 8, the rotor 410 of the rotation section 400 is housed in the main unit 20, the arm 310 of the rotation section 400 is housed in the display unit 30, the fixture 510 of the opening/closing section 500 is fixed to the display unit 30, the front section 520 of the opening/closing section 500 protrudes from the under surface of the display unit 30, the arm 310 of the stopper 300 is housed in the main unit 20, the protrusion 320 of the stopper 300 protrudes from the main unit 20 and faces the front section 520 of the opening/closing section 500.

Figure 9:
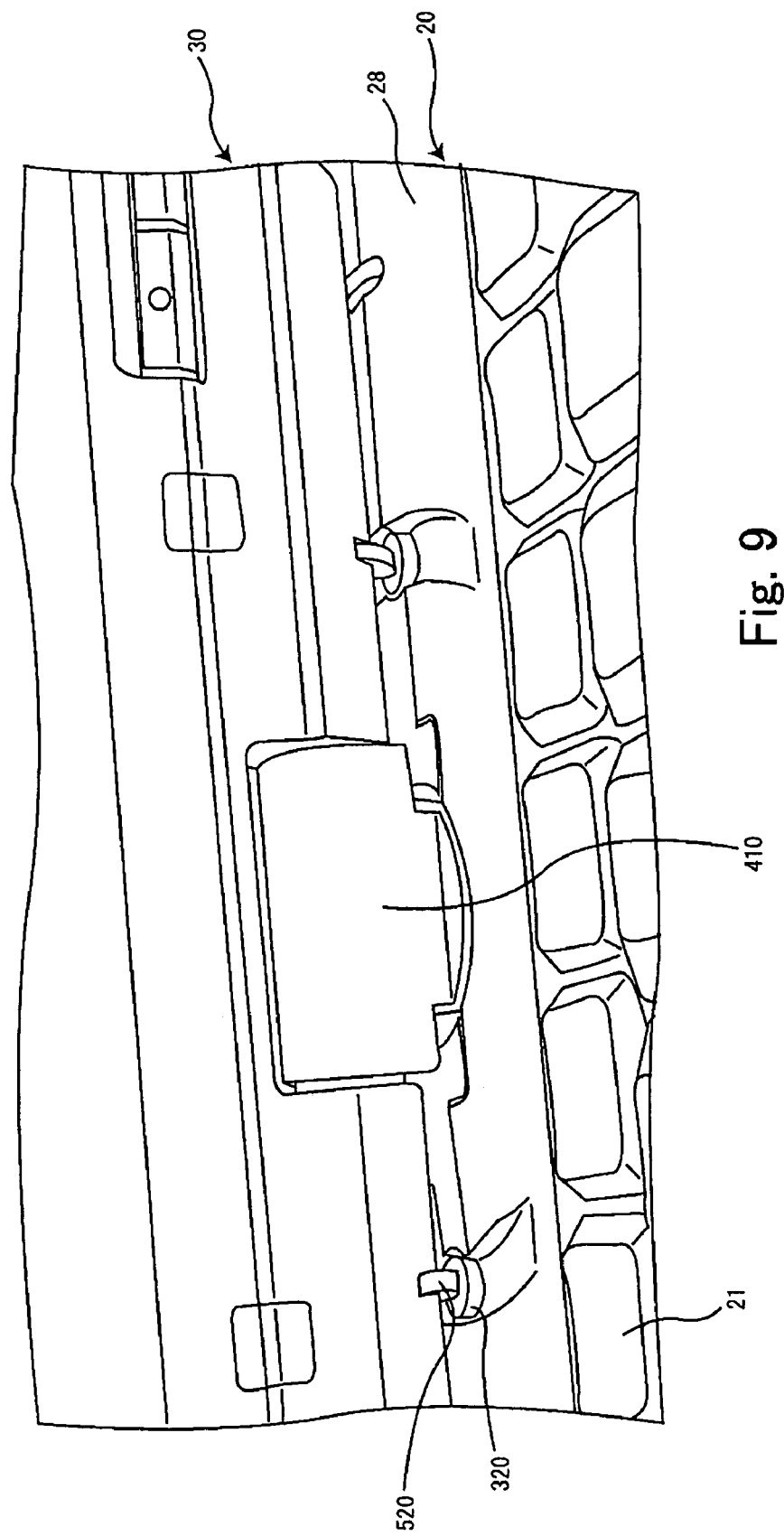
FIG. 9 is magnified view around the coupling unit in the personal computer that has been assembled.

FIG. 9 is magnified view around the coupling unit in the personal computer 10 that has been assembled.

As shown in FIG. 9, the side of the main unit 20 that is closer to the coupling unit 40 than the keyboard 21 is covered with a cover 28, and the rotor 410 of the rotation section 400 and the arm 310 of the stopper 300 are hidden.

Basically, the coupling unit 40 is constituted as described above.

Then, the method of restricting/releasing the rotation of the display unit 30 in the coupling unit 40 will be described in detail.

Figure 10A:
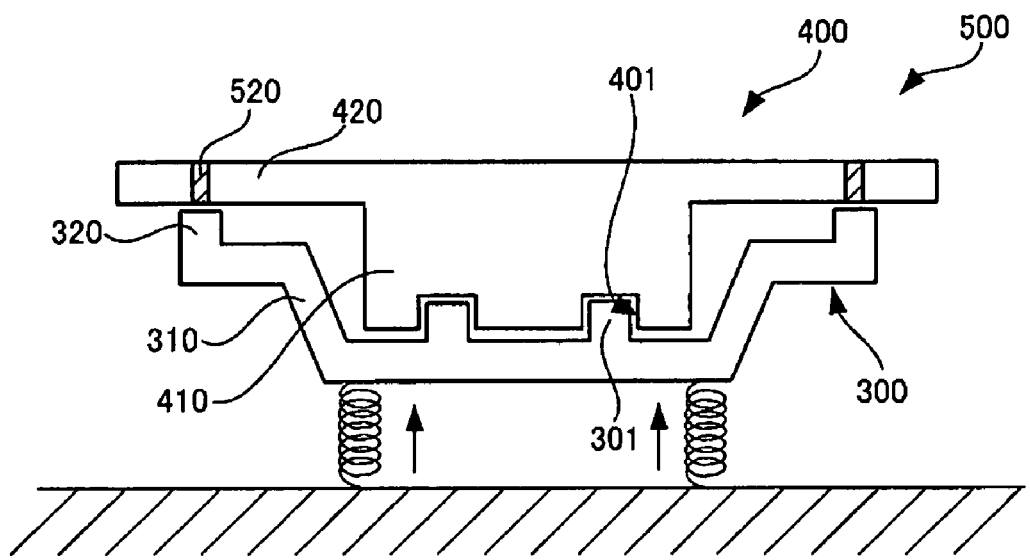
FIGS. 10(A) and (B) are diagrams illustrating the method of restricting/releasing the rotation of the display unit in the coupling unit.

FIGS. 10(A) and (B) are diagrams illustrating the method of restricting/releasing the rotation of the display unit 30 in the coupling unit 40.

FIG. 10(A) schematically shows the configuration of the coupling unit 40 in a state in which the display unit 30 is fully opened with respect to the main unit 20.

The rotor 410 of the rotation section 400 has a depressed portion 401, which opens downward, and the arm 310 of the stopper 300 has a protruding portion 301, which protrudes upward, and is fitted into the depressed portion 401 of the rotor 410. The depressed portion 401 corresponds to an example of the rotation axis-side fitting section according to the present invention, and also corresponds to an example of the depressed portion according to the present invention. Further, the protruding portion 301 corresponds to an example of the stopper-side fitting section, and also corresponds to an example of the protruding portion according to the present invention.

When the display unit 30 is widely opened with respect to the main unit 20, the opening/closing section 500 is laid with respect to the body unit 20, and the front section 520 of the opening/closing section 500 is not pushing down the protrusion 320 of the stopper 300. Since the stopper 300 is energized upward by a spring with respect to the main unit 20, in a state shown in FIG. 10(A), the protruding portion 301 of the stopper 300 is fitted into the depressed portion 401 of the rotation section 400 to prohibit the rotation of the rotation section 400.

When the display unit 30 is gradually erected from the state shown in FIG. 10(A), the opening/closing section 500 stands with respect to the main unit 20, and the front section 520 of the opening/closing section 500 starts pushing down the protrusion 320 of the stopper 300. As a result, the stopper 300 is pushed down, and the protruding portion 301 of the stopper 300 starts disengaging from the depressed portion 401.

Figure 10B:
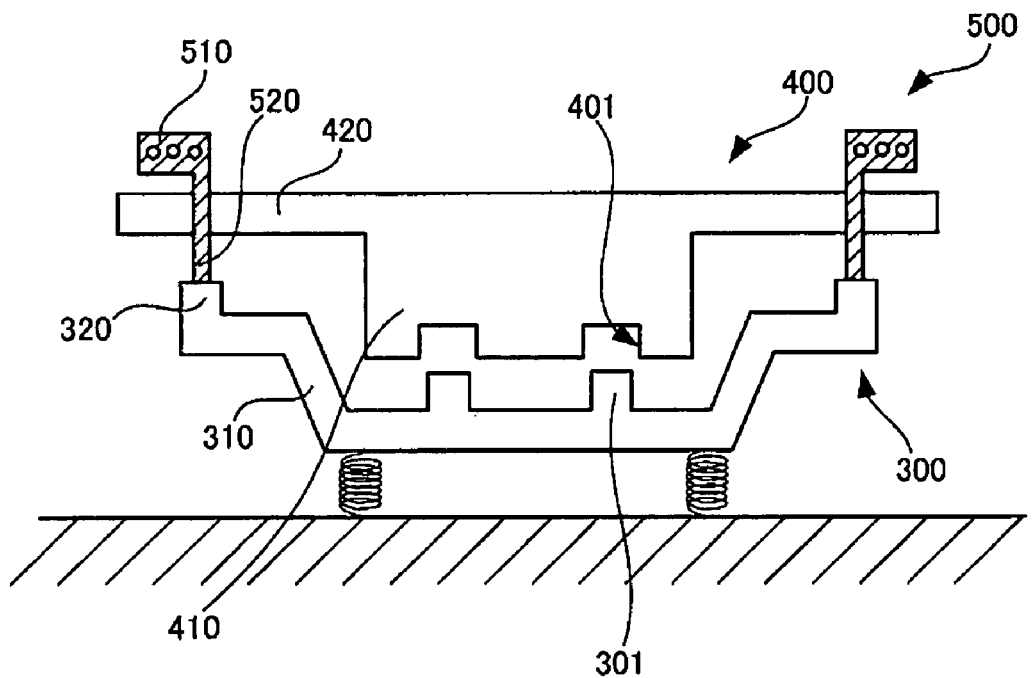

FIG. 10(B) schematically shows the configuration of the coupling unit 40 in a state in which the display unit 30 is standing with respect to the main unit 20.

When the display unit 30 is erected and the opening/closing angle reaches the upper limit of a predetermined specified opening angle (80 to 100 degrees in this example), the protruding portion 301 of the stopper 300 fully disengages from the depressed portion 401, and the prohibition of the rotation of the rotation section 400 by the stopper 300 is released. In the standing state shown in FIG. 10(B), the front section 520 of the opening/closing section 500 is erected with respect to the main unit 20, thus the stopper 300 is pushed down most.

When the display unit 30 is rotated in a state in which the prohibition of the rotation by the stopper 300 is released, the opening/closing section 500 mounted on the arm 420 of the rotation section 400 and fixed to the display unit 30 also rotates with the rotation section 400. At that time, since a set of the protrusion 320 of the stopper 300 and the front section 520 of the opening/closing section 500, which are brought into contact with each other, are provided only on both sides of the center of the rotation axis of the rotation section 400, when the rotation section 400 rotates, the contact of the stopper 300 with the opening/closing section 500 are released, thus allowing smooth rotation to be achieved.

When the display unit is further closed from the state shown in FIG. 10(B), the opening/closing section 500 is laid forward so as to allow the fixture 510 to face the main unit 20 as compared with FIG. 10(A), weakening the force of the front section 520 of the opening/closing section 500 that pushes down the protrusion 320 of the stopper 300. When the display unit 30 is closed, and the opening/closing angle reaches the lower limit of the predetermined specified opening angle (80 to 100 degrees in this example), the stopper 300 is energized upward by the spring, thus the protruding portion 301 of the stopper 300 is fitted into the depressed portion 401.

In this manner, according to the present embodiment, since the rotation is allowed only when the display unit 30 is at the predetermined specified opening angle (80 to 100 degrees in this example) with respect to the main unit 20, a problem that the display screen 31 is broken because the display unit 30 is rotated when the display unit 30 is closed or widely opened can be prevented.

In addition, as shown in FIG. 10(B), since the rotation is prohibited when the display unit 30 is closed with respect to the main unit 20, a lock mechanism provided in a conventional personal computer to stop the rotation of the display unit 30 need not be provided near the display screen 31, allowing the design to be improved.

Although an example in which the electronic apparatus of the present invention is applied to a tablet personal computer has been described herein, the electronic apparatus of the present invention may be applied to a personal computer without a tablet function, an electronic notepad, and the like.

What is claimed is:

1. An electronic apparatus, comprising:
   a first housing;
   a second housing; and
   a coupling unit that openably/closably and rotatably couples the second housing with the first housing,
   wherein the coupling unit is a biaxial coupling unit comprised of a rotation axis that vertically extends when the first housing is placed on a horizontal table, and is rotatably coupled to the first housing, and an opening/closing axis that is fixed to the rotation axis, horizontally extends, openably/closably supports the second housing with respect to the first housing, and rotates as the rotation axis rotates, and
   the coupling unit comprises a stopper that enables the rotation axis to rotate when the second housing is opened with respect to the first housing within a range of rotation-allowing opening angle that allows for rotation, and the stopper prohibits the rotation axis from rotating when the second housing is opened with respect to the first housing outside the range of rotation-allowing opening angle.

2. The electronic apparatus according to claim 1, wherein the stopper is unrotatably supported by the first housing, and the stopper and the rotation axis comprise a stopper-side fitting section and a rotation axis-side fitting section, respectively, which are fitted into each other in a closed state in which the second housing is laid over the first housing, and
   the stopper and a second housing assembly, which includes the second housing and the opening/closing axis, comprise a stopper-side contact member and a second housing-side contact member, respectively, which are brought into contact with each other to release the fit of the stopper-side fitting section into the rotation axis-side fitting section when the second housing is opened within the range of rotation-allowing opening angle from the closed state.

3. The electronic apparatus according to claim 2, wherein when the second housing is rotated about the rotation axis after the second housing-side contact member is brought into contact with the stopper-side contact member, the contact of the second housing-side contact member with the stopper-side contact member is released, and the release of the fit of the stopper-side fitting section into the rotation axis-side fitting section is kept.

4. The electronic apparatus according to claim 2, wherein the stopper-side fitting section is formed of a protruding portion that protrudes upward, and the rotation axis-side fitting section is formed of a depressed portion that opens downward, and into which the protruding portion is fitted, and
   the stopper is energized upward by a spring and the protruding portion is fitted into the depressed portion in the closed state, and the second housing-side contact member pushes down the stopper-side contact member from above to remove the protruding portion from the depressed portion when the second housing is opened within the range of rotation-allowing opening angle from the closed state.

5. The electronic apparatus according to claim 2, wherein a set of the stopper-side fitting section and the rotation axis-side fitting section, and a set of the stopper-side contact member and the second housing-side contact member are provided, respectively, on both sides of the center of the rotation axis.

6. The electronic apparatus according to claim 2, wherein the stopper-side contact member is made of a stiffer material than that of a portion other than the stopper-side fitting section of the stopper.

7. The electronic apparatus according to claim 4, wherein the stopper comprises an arm extending on both sides of the center of the rotation axis, the stopper-side fitting section at a position halfway of the arm, and the stopper-side contact member at an end of the arm.

8. The electronic apparatus according to claim 2, wherein the second housing-side contact member is a metal member, and the stopper-side contact member is a resin member having a higher lubricating property than that of the second housing-side contact member.

9. The electronic apparatus according to claim 1, wherein the second housing comprises a display screen where information is displayed.

10. The electronic apparatus according to claim 1, wherein the first housing comprises a keyboard by which instructions corresponding to operation is entered.

11. The electronic apparatus according to claim 9, further comprising display control means that displays, in a first usage state in which the second housing is opened with respect to the first housing, information in a first display mode in which information is displayed on the display screen with the direction of the rotation axis as the vertical direction, and also displays, in a second usage state in which the second housing is laid over the first housing with the display screen turned outward, information in a second display mode in which information is displayed with the direction perpendicular to the rotation axis as the vertical direction.

* * * * *